United States Patent
Howell

[11] 3,714,570
[45] Jan. 30, 1973

[54] APPARATUS FOR MEASURING THE EFFECTIVE VALUE OF ELECTRICAL WAVEFORMS

[76] Inventor: Jack D. Howell, 9815 Memphis Avenue, Brooklyn, Ohio 44144

[22] Filed: April 9, 1970

[21] Appl. No.: 26,948

[52] U.S. Cl. .....................324/132, 328/26, 328/144
[51] Int. Cl. ..........................G01r 15/10, G06g 7/20
[58] Field of Search ........324/132, 123, 119; 330/28, 330/112; 328/26, 144; 307/229

[56] References Cited

UNITED STATES PATENTS

| | | | |
|---|---|---|---|
| 3,345,562 | 10/1967 | Rockwell | 324/119 |
| 2,861,182 | 11/1958 | Green | 324/132 |
| 3,226,633 | 12/1965 | Schneider | 324/132 |
| 3,159,787 | 12/1964 | Sexton et al. | 324/123 X |
| 3,432,764 | 3/1969 | Kermicle | 324/123 X |
| 3,553,566 | 1/1971 | Nagy, Jr. | 328/26 X |
| 3,555,432 | 1/1971 | Ellermeyer | 328/26 |
| 3,564,387 | 2/1971 | Gadberry | 328/26 X |
| 3,564,389 | 2/1971 | Richman | 328/26 X |

*Primary Examiner*—Rudolph V. Rolinec
*Assistant Examiner*—Ernest F. Karlsen
*Attorney*—Frank H. Foster, Anthony D. Cennamo and Francis F. Kremblas, Jr.

[57] ABSTRACT

Devices for measuring the effective value of an input waveform are disclosed which employ one or more amplifiers and a feedback path for supplying a feedback signal to the input of the detector which has a value such that the average output value of the waveform from the measuring circuit is substantially equal to the effective value of the input waveform. The output waveform is coupled to a conventional average measuring device, such as a meter, to obtain a measurement of the RMS (root-mean-square) or the effective value of the input waveform.

The measuring apparatus of one of the disclosed embodiments is a single stage differential amplifier which has its non-inverting input terminal coupled to its output terminal through a resistor and a capacitor in series. Two other disclosed embodiments include two-stage circuits each of which has a pair of operational amplifiers which are coupled so that the second amplifier stage supplies an output signal of one polarity through an RC feedback path to the inverting input terminal of the first stage of amplification. A series combination of a resistor and a capacitor which is coupled between the resistor of the feedback path and the inverting input of the output amplifier stage is disclosed in one of the two-stage embodiments.

9 Claims, 3 Drawing Figures

PATENTED JAN 30 1973　　3,714,570

INVENTOR
JACK D. HOWELL

BY Yount and Tarolli
ATTORNEYS

APPARATUS FOR MEASURING THE EFFECTIVE VALUE OF ELECTRICAL WAVEFORMS

The measurement of the RMS values or the effective values of electrical voltage or current waveforms has previously been achieved through inefficient and relatively costly methods in which the energy expended in a resistance is measured by means of a thermocouple, a bolometer or other heat-sensitive device. In addition to the above-mentioned problems, the measurement of the effective value of a waveform by the prior methods may produce an undesirable or even an intolerable loading on the circuit that is producing the waveform that is being measured.

Electrodynamometer instruments are also used to provide a RMS indication of a rectified current waveform. Aside from being inefficient and relatively costly, the electrodynamometer requires careful shielding from external magnetic fields, and at high frequencies it is inaccurate due to the "skin effect" which results when eddy currents are set up on the outer surfaces of its coils.

It is an object of the present invention to provide an apparatus for the measurement of the effective value of an input waveform by providing a feedback signal to the amplifying stage that receives the input waveform of a magnitude such that the average value of the resulting output waveform is approximately equal to the effective value of the input waveform.

It is an additional object of the present invention to provide an apparatus for the measurement of the effective value of an electrical waveform which has a circuit with a gain modification means that modifies the gain of an amplifier in such a manner that the resulting output waveform has an average value which is approximately equal to the effective value of the input waveform and which preferably has circuit components which improve the accuracy of the measurement when waveforms having a predetermined range of crest factors are measured.

It is a further object of the present invention to provide an apparatus for the measurement of the effective value of an electrical waveform which is supplied to the input of an amplifier in which a feedback signal is coupled to the input of the amplifier through a series path consisting of a resistor and a capacitor of such values that the average value of the resulting output waveform is approximately equal to the effective value of the input waveform to the circuit, the apparatus preferably also including circuit means such as a second series resistor-capacitor path for extending the measurement accuracy of the apparatus to waveforms having crest factors which are relatively larger than that of a sinusoidal waveform.

Additional objects and advantages of the present invention will be apparent from the following drawings in which.

Figure 1:
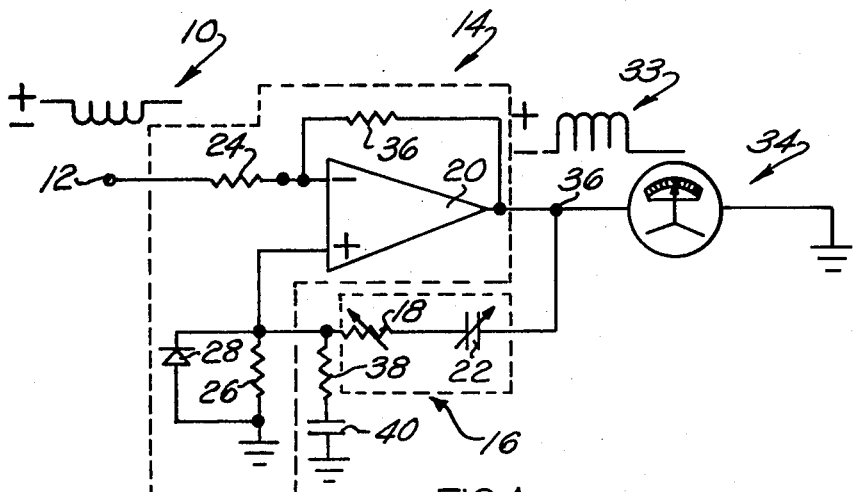
FIG. 1 is a schematic of a single amplifier stage embodiment of the present invention.

The circuit shown in FIG. 1 represents a one embodiment of the present invention which is suitable for measuring the effective value of a negative going DC input waveform, such as the waveform 10 which is supplied to the input terminal 12 of the circuit.

The amplifier circuit 14 is a conventional differential input amplifier circuit except for a positive feedback path from the output of the amplifier 20 to the non-inverting input terminal (+ terminal) of the amplifier 20. This feedback path consists of capacitor 22 and a resistor 18, which are preferably, but not necessarily, variable circuit elements. The input waveform 10 is supplied to the input terminal (− terminal) of the amplifier 20 through the input resistor 24. The resistor 26 between the non-inverting input terminal and ground develops the feedback voltage for the non-inverting input terminal. To prevent a negative polarity voltage from being applied to the non-inverting terminal, the diode 25 is connected across the resistor 26. The resistor 36 is a feedback resistor which supplies negative feedback to the inverting input terminal of the amplifier 20.

If the resistor 18 and the capacitor 22 are variable elements, they may be varied in order to calibrate the circuit 14 when input waveforms of known effective values are supplied to the input terminal 12. The form factor or crest factor of a waveform is the ratio of its RMS value to its average value. The series combination of the resistor 38 and the capacitor 40 which is coupled between the non-inverting input terminal of the amplifier 20 and ground is employed to improve the accuracy of the circuit when waveforms having a crest factor greater than that of a sinusoidal waveform are to be measured. The resistor 38 and the capacitor 40 in conjunction with the resistor 18 integrate or smooth the feedback signal supplied through the resistor 18.

The output terminal 36 of the amplifier 20 is coupled to the average reading meter 34 to supply the meter 34 with the output waveform 33. The gain of the circuit 14 is increased by the positive feedback to the non-inverting input terminal of the amplifier 20 to the extent that the average value of the output waveform 33 is approximately equal to the effective value of the input waveform 10. The gain of the circuit must be less than that required to cause the circuit to oscillate due to the self-excitation provided by the feedback signal. The phase shift introduced into the feedback signal by the capacitor 20 also tends to reduce the possibility of oscillation.

The reading of the meter 34, therefore, provides an indication of the effective value of the input waveform. Since the input impedance of the amplifier circuit 14 is relatively large, the effective value of high or low frequency waveforms may be measured without appreciable loading of the circuit which is being measured, and power is not wasted in generating heat as it is in prior measuring techniques.

Figure 2:
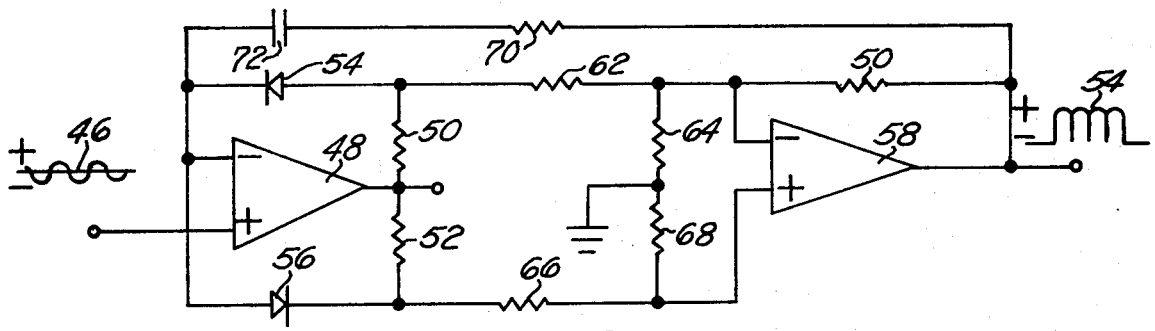
FIG. 2 is a schematic of a two-stage amplifier embodiment of the present invention suitable for measurement of DC and AC input waveforms.

The circuit shown in FIG. 2 may be used to provide for the measurement of the effective value of either a symmetrical AC input waveform or a DC input waveform.

The AC input current waveform 46 is supplied to the non-inverting input terminal of an input amplifier 48. The amplifier 48 will produce a positive polarity output waveform when the input waveform 46 has a positive polarity; and it will produce a negative polarity output waveform when the input waveform 46 has a negative polarity. The resistors 50 and 52 are connected to the diodes 54 and 56, respectively, which are poled so that both a positive polarity output waveform and a negative polarity output waveform from the amplifier 48 are fed back to the inverting input terminal of the amplifier 48. Thus, a positive polarity output waveform from the amplifier 48 is attenuated due to the feedback path consisting of the resistor 50 and the diode 54 and a negative polarity output waveform from the amplifier 48 is also attenuated due to the feedback path consisting of the resistor 52 and the diode 56.

The output amplifier 58 is an operational amplifier and the feedback resistor 50 coupled between its output and its inverting input terminal is the required feedback resistor. The resistors 62, 64, 66 and 68 form a balanced input network for the amplifier 58. A positive polarity waveform supplied to the non-inverting input terminal of the amplifier 48 will cause the junction point of the resistors 52 and 66 to be more positive in potential than the potential at the junction point of the resistors 50 and 62 and the corresponding portion of the output waveform 59 of the amplifier 58 will have a positive polarity. The amplifiers 48 and 58 both preferably have gains which are only slightly greater, as will be evident from the values of the circuit elements which are listed below. If the gains of these amplifiers are increased, the magnitude of the corresponding feedback signal must be correspondingly reduced to prevent oscillation of the circuit.

When a negative polarity input waveform is present on the non-inverting input terminal of the amplifier 48, the potential on the inverting input terminal approaches the negative potential of the non-inverting input terminal and the junction point of the resistors 50 and 62 becomes more negative in potential than the potential at the junction point of the resistors 52 and 66. The corresponding portion of output waveform 59 will then have a positive polarity and, therefore, it is seen that rectification of the input waveform 46 as well as amplification of the input waveform 46 occurs in the circuit of FIG. 2.

The output of the amplifier 58 is coupled through a resistor 70 and a capacitor 72 to supply a feedback signal to the inverting input terminal of the amplifier 48. The gain of the circuit of FIG. 2 will be approximately equal to the ratio of the root-mean-square value of the input waveform to the average value of the input waveform when an input AC waveform is symmetrical. The average value of the output waveform which is derived from the output amplifier 58 will then be approximately equal to the root-mean-square or the effective value of the input waveform which is supplied to the input amplifier 48 and it can be measured by a conventional average-reading meter to give an indication of the RMS value of the input waveform.

Figure 3:
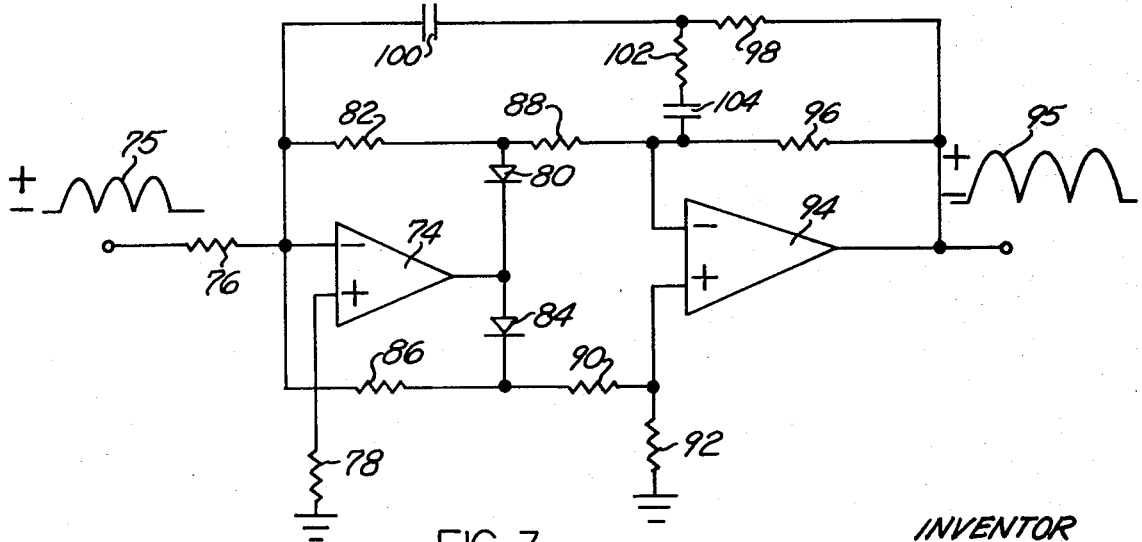
FIG. 3 is a schematic of a two-stage amplifier embodiment of the present invention suitable for measurement of a DC input waveform.

The embodiment of FIG. 3 of the present application is useful for measuring the effective value of a pulsating DC waveform. The DC input waveform 75 is supplied to the inverting input terminal of the input amplifier 74 through the input resistor 76 and the non-inverting input terminal of the amplifier 74 is coupled to ground through the resistor 78. The output amplifier 94 has a balanced input network which includes the resistors 88 and 90. A feedback resistor 96 is connected between its output and its inverting input terminal and a resistor 92 is connected between its non-inverting input terminal and ground.

If the input waveform is positive in polarity, the output waveform of the amplifier 74 will be negative in polarity and the diode 80 will be forward biased. A negative feedback path from the output of the amplifier 74 is then established through the diode 80 and the resistor 82 to the inverting input terminal of the amplifier 74.

When the waveform from the amplifier 74 is of a negative polarity, a feedback path is established to the inverting input terminal of the amplifier 74 through the diode 84 and the input resistor 86. If the input waveform is negative in polarity, the output of the amplifier 74 will be a positive polarity waveform and the diode 84 will be forward biased. A positive polarity signal is then fed back to the inverting input terminal through the diode 84 and the resistor 86. The positive polarity output waveform from the amplifier 74 is also coupled to the non-inverting input terminal of the amplifier 94 through the resistor 88. The amplifiers 74 and 94 preferably have gains which approximate unity. The amplifier 94 will produce an average positive polarity output waveform 95 and the polarity of the output of the amplifier 74 since the junction of the resistors 82 and 88 will be predominantly less positive in potential than the junction of the resistors 86 and 90.

The resistors 98 and the capacitor 100 couple a positive feedback signal from the output of the amplifier 94 to the inverting input terminal of the amplifier 74. The resistor 102 and the capacitor 104 are employed to improve the accuracy of the circuit for certain ranges of crest factors. For example, when the circuit is employed to measure waveforms having crest factors of approximately 3–7, the resistor 102 and the capacitor 104 will improve the accuracy of the reading. The resistor 102 and the capacitor 104 in conjunction with the resistor control the input of negative feedback to be supplied to the inverting input terminal of the amplifier 94.

The average value of the output waveform 95 from the amplifier 94 approximates the root-mean-square or the effective value of the input waveform 75.

In the embodiments of FIGS. 1, 2 and 3 the output waveform obtained from a circuit with an RC feedback path is of a greater magnitude than the output waveform would be from the same circuit if it did not employ the RC feedback path. For a sinusoidal waveform, for example, the amplitude of the output waveform is increased to a point where the average value of the output waveform (the average value of a sinusoidal waveform being equal to approximately 0.636 times its maximum value) is equal to the RMS value of the input waveform (the RMS value of a sinusoidal waveform being equal to approximately 0.707 times its maximum value). The output waveform from each of the embodiments may be coupled to a conventional averaging device to obtain the effective value of the input waveform. The circuits of the present invention, therefore, are gain expansion circuits in which the gain is expanded in a controlled manner in response to the input waveform so that an output waveform has an average value which is equal to the effective value of the input waveform.

Representative values are given below for the described embodiments of FIGS. 1, 2 and 3 for the purpose of illustration. Limitation of the scope of the present invention to the values given below is, of course, not intended.

The op-amps previously described are conventional, high gain differential amplifiers commonly available for amplification purposes. For example, Fairchild µA709 types have been used. Fairchild µA741 and Harris Semiconductor HA 2502 are also suitable.

FIG. 1.

| Resistors | Values | |
|---|---|---|
| 18 | 17.4k* (0–25k) | *Nominal Value |
| 24 | 10k | |
| 36 | 22.1k | |
| 38 | 2.21k | |
| Capacitors | Values | |
| 22 | 10mfd* (0–25mfd) | *Nominal Value |
| 40 | 50mfd | |

FIG. 2

| Resistors | Values |
|---|---|
| 50 | 20k |
| 52 | 2k |
| 56 | 2k |
| 62 | 20k |
| 64 | 20k |
| 66 | 20k |
| 68 | 10k |
| 70 | 2.1k |
| Capacitors | Values |
| 72 | 200mfd |

FIG. 3

| Resistors | Values |
|---|---|
| 76 | 2.21k |
| 78 | 2.21k |
| 82 | 2.21k |
| 86 | 2.21k |
| 88 | 20k |
| 90 | 22.1k |
| 92 | 20k |
| 96 | 20k |
| 98 | 2.7k |
| 102 | 4.3k |
| Capacitors | Values |
| 100 | 250mfd |
| 104 | 100 mfd |

Although specific embodiments of the present invention have been disclosed there is no intention to limit the invention to the specific embodiments described since variations and modifications of such embodiments within the scope of the present invention will be apparent to those skilled in the art.

What is claimed is:

1. A measuring apparatus for providing an output signal at its output terminal having an average value approximately equal to the effective value of the input signal applied at its input terminal, the apparatus comprising:
   a. an amplifier/rectifier means connected between the input and the output of said apparatus for simultaneously amplifying and rectifying said input signal, said rectified/amplified output including an average dc component and Fourier ac components; and
   b. a series resistance and capacitance regenerative feedback means for regeneratively applying the Fourier ac components only of said output terminal to said input terminal of said amplifier/rectifier means.

2. An apparatus according to claim 1 wherein said amplifier/rectifier means full wave rectifies the signal at its input.

3. An apparatus according to claim 2 wherein an average reading meter is connected at said output of said measuring apparatus.

4. An apparatus to claim 2 wherein said amplifier/rectifier comprises:
   a. a first differential amplifier having two series connected resistor-diode pairs each series resistor-diode pair connecting the output of said first amplifier to the inverting input of said amplifier, said diodes being oppositely polarized and having said input signal applied to one of the inputs of said first amplifier; and
   b. a second differential amplifier having each of its inputs resistively connected to the intermediate node of a different one of said resistor-diode pairs, the output of said second amplifier being the output of said apparatus.

5. An apparatus according to claim 4 wherein a second series connected resistor and capacitor is connected between the intermediate node of said feedback means and the inverting input of said second differential amplifier.

6. An apparatus according to claim 4 wherein a full wave rectifier is interposed between said input terminal of said apparatus and the input of said first differential amplifier, said full wave rectifier being polarized for adding said input signal and said feedback signal.

7. An apparatus according to claim 6 wherein a second series connected resistor and capacitor is connected between the intermediate node of said feedback means and the inverting input of said second differential amplifier.

8. An apparatus according to claim 7 wherein the input signal is applied to the inverting input of said amplifier and wherein the noninverting input of said first amplifier is resistively connected to ground.

9. An apparatus according to claim 8 wherein a voltage divider connects the noninverting input of said second amplifier to its said intermediate node.

* * * * *